US008237546B2

(12) United States Patent
Bekritsky et al.

(10) Patent No.: US 8,237,546 B2
(45) Date of Patent: Aug. 7, 2012

(54) BACKSCATTER LIMITED TAGS

(75) Inventors: Benjamin Bekritsky, Hollis, NY (US); Randall Allen Drago, Gaithersburg, MD (US); Ming-Hao Sun, Gaithersburg, MD (US)

(73) Assignee: Symbol Technologies, Inc., Holtsville, IL (US)

( * ) Notice: Subject to any disclaimer, the term of this patent is extended or adjusted under 35 U.S.C. 154(b) by 965 days.

(21) Appl. No.: 11/770,572

(22) Filed: Jun. 28, 2007

(65) Prior Publication Data

US 2009/0002176 A1 Jan. 1, 2009

(51) Int. Cl.
*H04Q 5/22* (2006.01)
*G08B 13/14* (2006.01)

(52) U.S. Cl. .................................. 340/10.1; 340/572.1
(58) Field of Classification Search ................ 340/10.1, 340/572.1
See application file for complete search history.

(56) References Cited

U.S. PATENT DOCUMENTS

| 5,469,363 | A | | 11/1995 | Saliga |
| 5,508,705 | A | | 4/1996 | Spiess |
| 5,649,296 | A | * | 7/1997 | MacLellan et al. ............. 455/39 |
| 5,974,142 | A | * | 10/1999 | Heer et al. .................... 379/442 |
| 6,353,406 | B1 | * | 3/2002 | Lanzl et al. ................... 342/118 |
| 6,369,693 | B1 | * | 4/2002 | Gibson ......................... 340/5.8 |
| 6,549,119 | B1 | * | 4/2003 | Turner ........................ 340/10.5 |
| 6,727,816 | B1 | * | 4/2004 | Helgeson ..................... 340/540 |
| 7,245,213 | B1 | * | 7/2007 | Esterberg et al. ........ 340/539.12 |
| 7,479,882 | B2 | * | 1/2009 | Mahaffey ................... 340/572.3 |
| 7,710,269 | B2 | * | 5/2010 | Reep .......................... 340/572.1 |
| 7,834,743 | B2 | * | 11/2010 | Nagata et al. ............... 340/10.4 |

| 2004/0156229 | A1 | * | 8/2004 | Park ............................. 365/154 |
| 2005/0212673 | A1 | * | 9/2005 | Forster ....................... 340/572.7 |
| 2006/0017545 | A1 | * | 1/2006 | Volpi et al. ................... 340/10.4 |
| 2006/0030338 | A1 | * | 2/2006 | Harken et al. ............. 455/456.6 |
| 2006/0056317 | A1 | | 3/2006 | Manning et al. |
| 2006/0103457 | A1 | * | 5/2006 | Kumar et al. ................. 329/347 |
| 2006/0132302 | A1 | * | 6/2006 | Stilp ........................ 340/539.22 |

(Continued)

FOREIGN PATENT DOCUMENTS

EP 0727752 8/1996

(Continued)

OTHER PUBLICATIONS

PCT International Preliminary Report on Patentability Dated Jan. 14, 2010; 8 Pages.

(Continued)

*Primary Examiner* — Daniel Wu
*Assistant Examiner* — Kam Ma
(74) *Attorney, Agent, or Firm* — Glenn Frankenberger; Terri Hughes Smith; Kenneth A. Haas (57) ABSTRACT

Methods and apparatuses for secure communications of confidential information are provided. In an embodiment, a method of communicating with a population of radio frequency identification tags includes transmitting a first interrogation signal, receiving a response to the first interrogation signal from at least one RFID tag at a first received signal strength including at least a portion of a first identification code, and transmitting a second interrogation signal that includes a request for confidential information, a command to transmit a response to the second interrogation signal at a secure power level, and the first identification code. In another embodiment, a method for communicating with an RFID tag includes receiving an interrogation signal that includes a request for confidential information and transmitting a response to the interrogation signal at a secure power level. The response includes the confidential information.

14 Claims, 8 Drawing Sheets

U.S. PATENT DOCUMENTS

| | | | |
|---|---|---|---|
| 2007/0018793 A1* | 1/2007 | Stewart et al. | 340/10.3 |
| 2007/0034691 A1* | 2/2007 | Davis et al. | 235/382 |
| 2007/0046369 A1* | 3/2007 | Schober et al. | 330/7 |
| 2007/0052520 A1* | 3/2007 | Talty et al. | 340/10.1 |
| 2008/0068174 A1* | 3/2008 | Al-Mahdawi | 340/572.7 |
| 2008/0150698 A1* | 6/2008 | Smith et al. | 340/10.4 |
| 2009/0002176 A1* | 1/2009 | Bekritstky et al. | 340/572.7 |

FOREIGN PATENT DOCUMENTS

| | | |
|---|---|---|
| JP | 2005-346138 A * | 12/2005 |
| WO | 2004089017 A1 | 10/2004 |

OTHER PUBLICATIONS

EPC Communication Pursuant to Article 94(3) EPC, Apr. 23, 2010, 4 pages.

EPC Notice of Allowance Dated Aug. 31, 2011 for Counterpart Application EPC 08770567.9-2210.

Chinese Office Action Dated Jan. 29, 2012 for Counterpart Application CN200880101917.3.

Canada Office Action Dated Mar. 6, 2012 for Counterpart Application 2,691,828.

* cited by examiner

BACKSCATTER LIMITED TAGS

FIELD OF THE INVENTION

The present invention relates to radio frequency identification (RFID) technology. Specifically, the present invention relates to secure communications between RFID readers and RFID tags.

BACKGROUND

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically transmit radio frequency signals to which the tags respond. Each tag can store a unique identification number.

RFID tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

In addition to indicating the presence of an item, RFID tags also often store information that is read by readers. Communications between a reader and a tag may result in unintended recipients receiving signals transmitted by the tag. In cases in which tags store confidential information, communications between a reader and a tag must be secure to prevent unintended recipients from receiving the confidential information.

Thus, what is needed is way of preventing unintended recipients from receiving signals transmitted by a tag.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Figure 1:
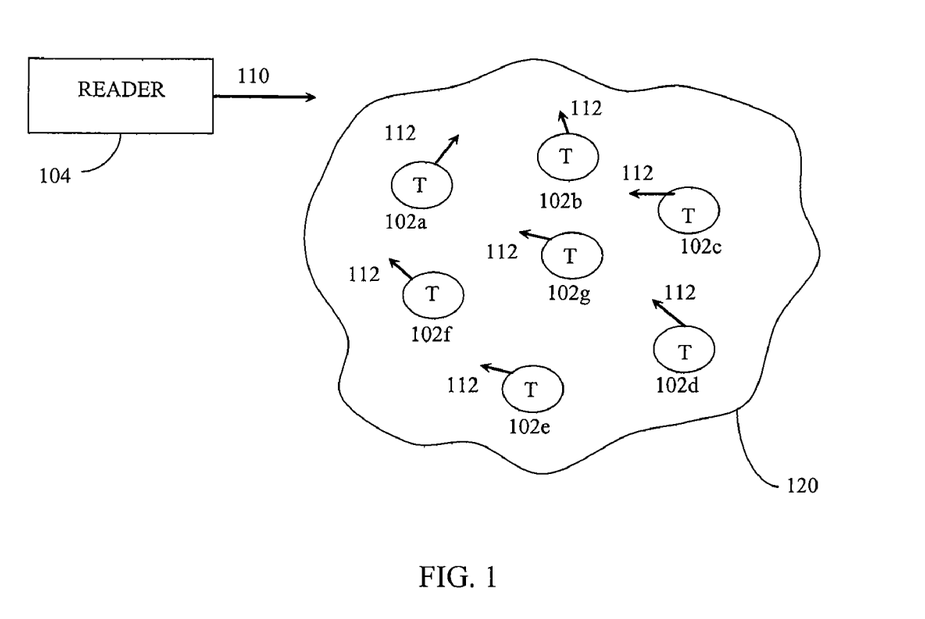
FIG. 1 illustrates an environment where RFID readers communicate with an exemplary population of RFID tags, according to an embodiment of the present invention.

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes one or more readers 104. A reader 104 may be requested by an external application to address the population of tags 120. Alternatively, reader 104 may have internal logic that initiates communication, or may have a trigger mechanism that an operator of reader 104 uses to initiate communication.

As shown in FIG. 1, reader 104 transmits an interrogation signal 110 having a carrier frequency to the population of tags 120. Reader 104 operates in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, such as an identification number of the responding tag 102. In the embodiments described herein, a reader may be capable of communicating with tags 102 according to any suitable communication protocol, including binary traversal protocols, slotted aloha protocols, Class 0, Class 1, EPC Gen 2, any others mentioned elsewhere herein, and future communication protocols.

Figure 2:
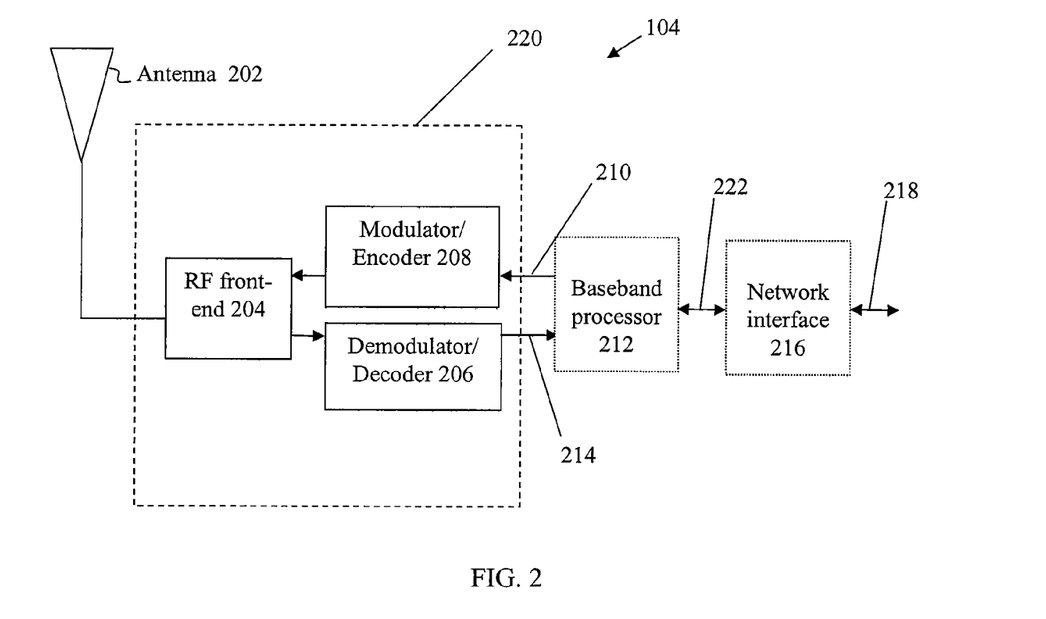
FIG. 2 shows a block diagram of an example RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions. Receiver and transmitter portion 220 may also be referred to as a transceiver.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

Figure 3A:
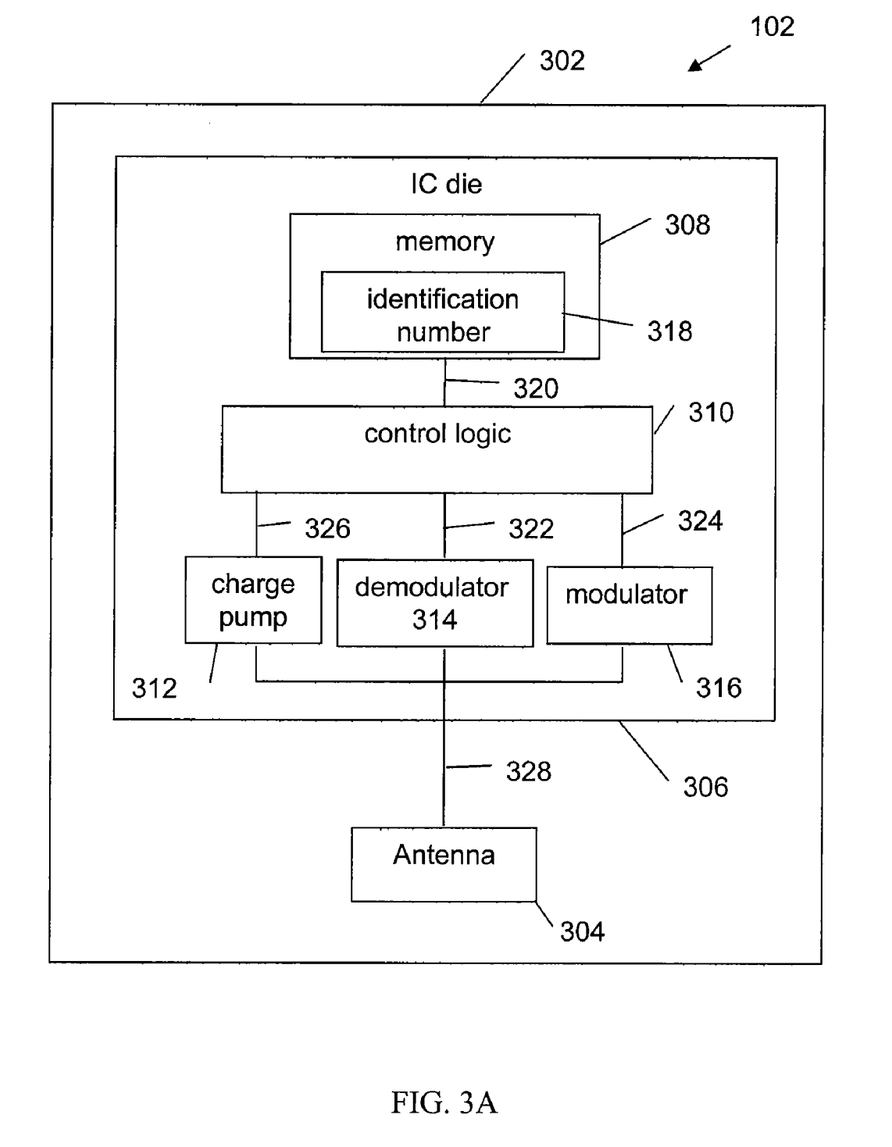
FIG. 3A shows a block diagram of an example RFID tag.

The present invention is applicable to any type of RFID tag. FIG. 3A shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. Another example form of a "tag" is a tag inlay that has been attached to another surface, or between surfaces, such as paper, cardboard, etc., for attachment to an object to be tracked, such as an article of clothing, etc.

Figure 3B:
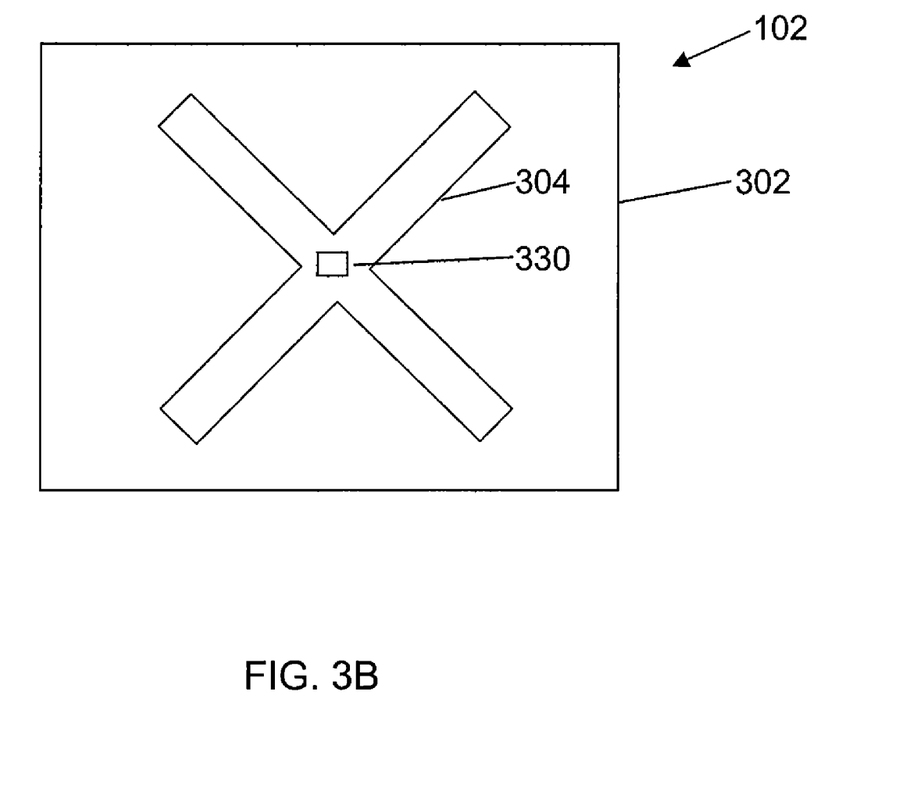
FIG. 3B shows a top view of an example RFID tag.

FIG. 3B shows a top view of an example of tag 102. Tag 102 includes a substrate 302, antenna 304, and an electrical circuit 330. Electrical circuit 330 may include elements one or more elements of IC 306 shown in FIG. 3A. Electrical circuit 330 also may store an identification code that identifies tag 102. Electrical circuit 330 may be commercially available as a single integrated circuit or may have separate components that are assembled with tag 102.

Example embodiments of the present invention are described in further detail below. Such embodiments may be implemented in the environments and readers described above, and/or in alternative environments and alternative RFID devices.

Example RFID Tag Embodiments

RFID communications often involve confidential information being communicated to a reader from a tag. Such confidential information may be a password, a location, or the presence of an item with which the tag is associated. To acquire this confidential information, unauthorized entities may place receivers in the general vicinity of the reader and/or the tag. To prevent such entities from gaining access to the confidential information, output power levels are limited, in accordance with an embodiment of the present invention. Lowering the output power level reduces the total area over which an RF signal may be received, thus making it less likely that the confidential information will be received by unauthorized entities.

Methods, systems, and apparatuses for secure communications between an RFID reader and an RFID tag are presented. In an embodiment, a tag decreases an output power level in response to a request for confidential information.

As described herein, RFID tags transmit RF signals at output power levels. The output power level is defined as a power of a signal fed to an antenna of the tag. As described above, many types of tags do not independently generate RF signals, rather they backscatter received interrogation signals. A backscatter power level, as described herein, is a relative quantity defined as the ratio between the output power level and the received power associated with a received interrogation signal. While the received power levels of different interrogation signals may differ, the backscatter power level for a given tag typically stays generally constant over all RFID communications.

Also, as described herein, in RF communications, an RF signal is incident on a receiver. The power associated with the incident RF signal is termed the incident RF signal power. An antenna of the receiver typically converts a portion of the incident RF signal to an electrical current. The power of the signal produced by the antenna is termed the received power. The received power is a fraction of the incident power typically determined by antenna characteristics. A received signal strength is a value that is representative of the received power. For example, a received signal strength indication (RSSI) value is a value that is indicative of the received power. The RSSI value may be a digital value or an analog voltage depending on the particular implementation.

The example embodiments described herein are provided for illustrative purposes, and are not limiting. The examples described herein may be adapted to any type of RFID communications. Further structural and operational embodiments, including modifications/alterations, will become apparent to persons skilled in the relevant art(s) from the teachings herein.

Figure 4:
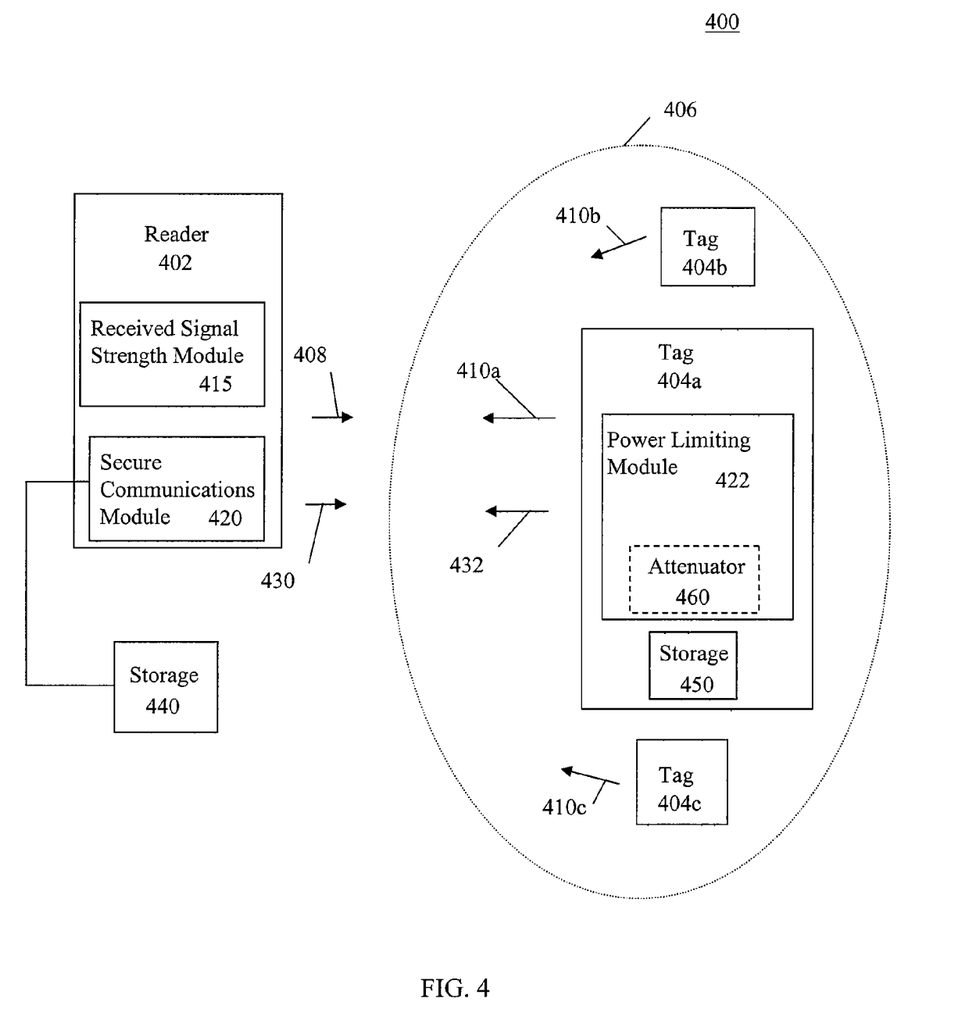
FIG. 4 illustrates an environment where a reader communicates with a population of RFID tags, according to an embodiment of the present invention.

FIG. 4 shows an environment 400, in which an RFID reader 402 communicates with a population of tags 406, according to an embodiment of the present invention. Reader 402 includes a received signal strength module 415 and a secure communications module 420. Secure communications module 420 is coupled to a storage 440. Storage 440 may be external to reader 402.

Population of RFID tags 406 includes tags 404a-c. Tag 404a includes a power limiting module 422 and a storage 450. Power limiting module 422 optionally includes an attenuator 460. Environment 400 of FIG. 4 will be described with reference to a flowchart 500 provided in FIG. 5.

Figure 5:
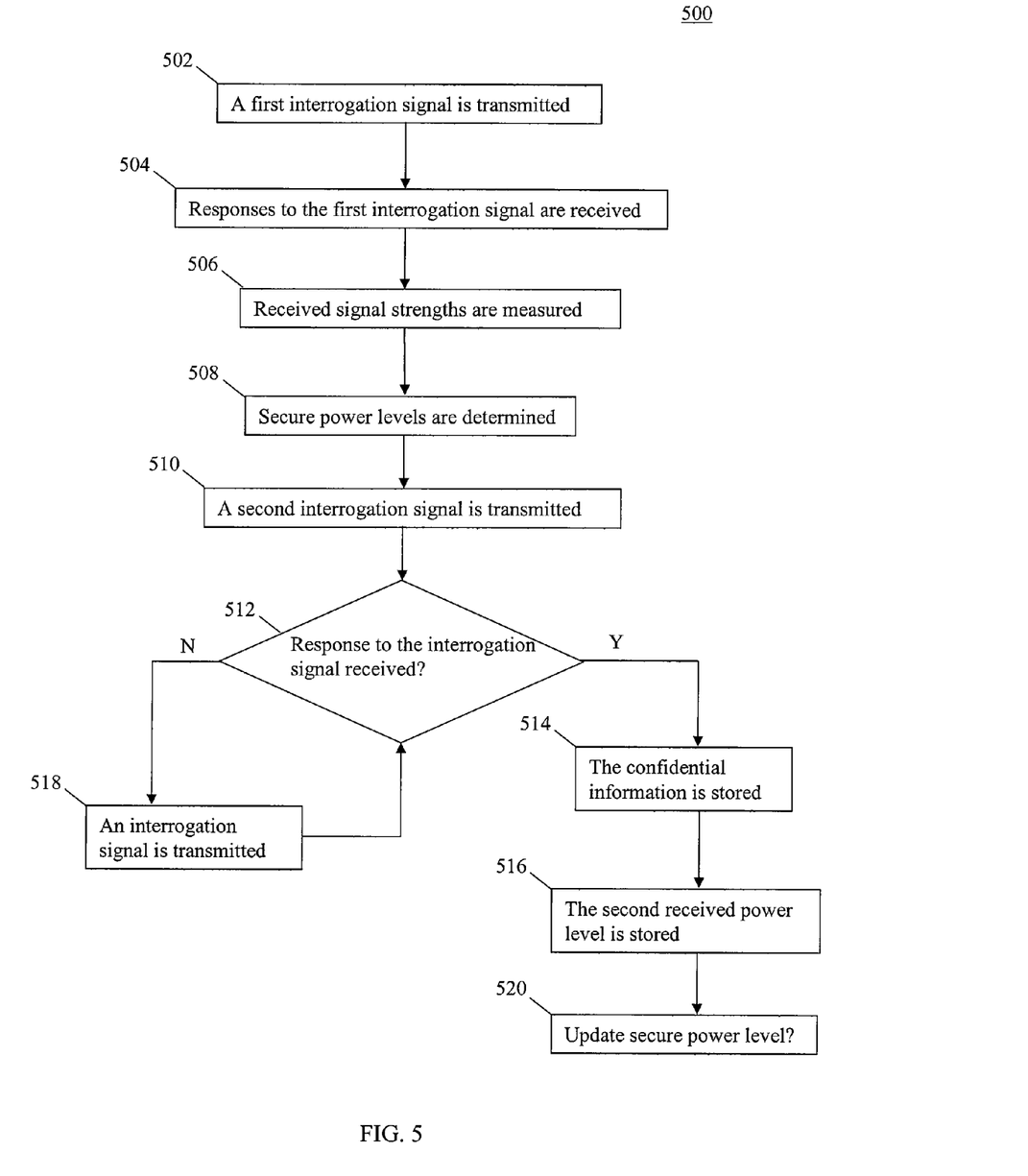
FIG. 5 shows a flowchart providing example steps for communicating with a population of RFID tags, according to an embodiment of the present invention.

FIG. 5 shows flowchart 500 providing example steps for communicating with a population of RFID tags, according to an embodiment of the present invention. Other structural and operational embodiments will be apparent to persons skilled in the relevant art(s) based on the following discussion. Flowchart 500 is described with reference to the embodiment of FIG. 4. However, flowchart 500 is not limited to that embodiment. The steps shown in FIG. 5 do not necessarily have to occur in the order shown. The steps of FIG. 5 are described in detail below.

Flowchart 500 begins with step 502. In step 502, a first interrogation signal is transmitted. For example, in FIG. 4, an interrogation signal 408 is transmitted by reader 402. In the embodiment of FIG. 4, tags 404a-c of population of tags 406 receive interrogation signal 408.

In step 504, responses to the first interrogation signal is received. For example, in FIG. 4, backscattered responses 410a-c are received by reader 402. Backscattered responses 410a-c include identification codes that may identify tags 404a-c to reader 402. In alternate singulation protocols, backscattered responses 410a-c may include portions of identification codes. Backscattered responses 410a-c are transmitted at a normal power level. A normal power level, as described herein, is the power level with which tags backscatter responses that do not contain confidential information.

In alternate embodiments, tags of a population of tags may be singulated according to other singulation protocols such as, but not limited to, Class 0 and Class 1, as would be appreciated by those skilled in the relevant art(s).

In an embodiment, multiple responses to the first interrogation signal are received substantially simultaneously creating a conflict. In such an embodiment, a contention resolution protocol may be performed to isolate one tag of the population of tags. As would be apparent to those skilled in the relevant art(s), contention resolution protocols may be performed multiple times to singulate multiple tags of the population of tags.

In step 506, a received signal strength associated with each of the received responses to the first interrogation signal is measured. For example, in FIG. 4, received signal strength module 415 may measure a received signal strength associated with each response of responses 410a-c. In an embodiment, received signal strength module 415 produces received signal strength indication (RSSI) values that are proportional to the received signal strength associated with each response of responses 410a-c. Values corresponding to the received signal strength of each response of responses 410a-c may be stored as entries in records associated with each tag in storage 440.

In step 508, secure power levels are determined. For example, in FIG. 4, secure power levels for tags 404a-c may be determined by secure communications module 420. In an embodiment, secure communications module 420 may determine secure power levels for those tags that store desired confidential information. For example, if tag 404a stores confidential information desired by reader 402, secure communications module 420 determines a secure power level for tag 404a and may or may not determine secure power levels for tags 404b and 404c, which do not have desired confidential information. Secure communications module 420 may determine the secure power level as the minimum backscatter power level of tag 404a such that a response from tag 404a would be received by reader 402.

The secure power level may be determined based on the stored received signal strength associated with response 410a corresponding to tag 404a. Reader 402 may store characteristics of tag 404a as one or more entries in a record associated with tag 404a in storage 440. In determining a secure power level for tag 404a, secure communications 420 module may access power levels available to tag 404a through power limiting module 422.

Power limiting module 422 may include attenuator 460. To adjust the output power of tag 404a, power limiting module 422 may adjust the settings of attenuator 460. For example, power limiting module 422 may adjust the settings of attenuator 460 so that tag 404a has backscatter power levels 1, 2, or 3. Power level 3 may correspond to the normal backscatter power level, as described above. Power level 2 may correspond to a reduced backscattered power level and power level 1 may correspond to a substantially reduced backscattered power level. Based on the stored received signal strength associated with response 410a and the backscatter power level of tag 404a, secure communications module 420 can predict the received signal strength of a response from tag 404a.

Secure communications 420 module may also be preprogrammed with the minimum received signal strength that reader 402 requires to be able to properly receive RF signals. Based on this preprogrammed value, reader 402 may choose the lowest power setting of tag 404a that results in a response signal having a received signal strength above the minimum received signal strength.

For example, power levels 1, 2, and 3 may correspond to backscatter power levels in which 20%, 40%, and 80% of the received power is reflected back, respectively. Reader 402 may receive a response to an interrogation signal backscattered at power level 3 that has an associated RSSI value that indicates 1 mW was received at reader 402. Secure communications module 420 may be preprogrammed with a minimum received signal strength corresponding to 0.4 mW. In such a case, secure communications module 420 would determine that power level 2 results in reader 402 receiving 0.5 mW of power, which is above the minimum received power of 0.4 mW. Secure communications module 420 may also determine that power level 1 results in reader 402 receiving 0.25 mW, which is below the minimum received power. Thus, secure communications module 420 would determine that power level 2 is the secure power level.

In step 510, a second interrogation signal is transmitted. The second interrogation signal includes a request for confidential information and a command to transmit a response to the second interrogation signal at the secure power level. For example, in FIG. 4, reader 402 transmits second interrogation signal 430. Second interrogation signal 430 includes a request for confidential information stored on tag 404a and a command for tag 404a to respond to interrogation signal 430 at the secure power level. Tag 404a may store the confidential information in storage 450.

Interrogation signal 430 may also include the identification code(s) of tag(s) that contain desired confidential information. In an embodiment where more than one identification code is included, reader 402 effectively issues a global command to a subset of population of tags 406 to transmit confidential information. Secure power levels calculated for each designated tag may also be included in interrogation signal 430. Thus, interrogation signal 430 includes the identification code of tag 404a, so that tags 404b and 404c do not transmit confidential information and do not backscatter responses at the secure power level determined for tag 404a.

In step 512, it is determined whether a response to the second interrogation signal is received. For example, in FIG. 4, reader 402 may wait a predetermined amount of time for a response to interrogation signal 430 from tag 404a. If a response is not received during the time period, reader 402 determines a response was not received. As would be appreciated by those skilled in the relevant art(s), reader 402 may also determine whether a response from tag 404a is received according to predetermined procedures implemented in the communication protocol between reader 402 and tag 404a.

If a response is received, flowchart 500 proceeds to step 514. In step 514, the confidential information is stored. For example, in FIG. 4, reader 402 may store the confidential information contained within a response signal 432 in storage 440 in a record associated with tag 404a.

In step 516, a second received signal strength is stored. For example, reader 402 may store an RSSI value associated with response 432 as another entry in the record associated with tag 404a in storage 440.

If a response to the second interrogation signal is not received, flowchart 500 proceeds to step 518. In step 518, a third interrogation signal is transmitted. The third interrogation signal includes a command to re-transmit the requested confidential information at an increased power level. The increased power level is higher than the secure power level. In an embodiment, the increased power level remains a secure power level. However, the increased power level may be less secure than the secure power level. In other words, transmissions at the increased power level may be more likely to be received by unauthorized entities compared to transmissions at the secure power level, but may remain less likely to be received than transmissions at the normal power level.

For example, in FIG. 4, reader 402 may transmit a third interrogation signal (not shown) that includes the request for confidential information and a command to transmit a response to the third interrogation signal at an increased power level that includes the requested confidential information.

Flowchart 500 then returns to decision step 512, and it is determined whether a response to the third interrogation signal is received. If a response to the third interrogation is received, flowchart 500 proceeds to step 514. If a response to the third interrogation signal is not received, additional interrogation signals may be transmitted commanding increasing backscatter power levels until a response is received by reader 402.

In step 520, the secure power level is updated. For example, in FIG. 4, reader 402 may compare the RSSI value associated with responses 410 and 432 and determine that communication parameters between reader 402 and tag 404a have changed. For example, a distance between reader 402 and tag 404a may have changed. If the RSSI value associated with response 432 is larger than expected, the secure power level may be lowered to the next available level. Alternatively, if response signal 432 is not initially received by reader 402, the secure power level may be increased.

The steps of flowchart 500 describe an embodiment in which tags of a population of tags are singulated at normal power levels. In an alternate embodiment, identification codes of tags of the population of tags may be confidential. In such an embodiment, tags of a population of tags may be singulated at a secure power level.

Figure 6:
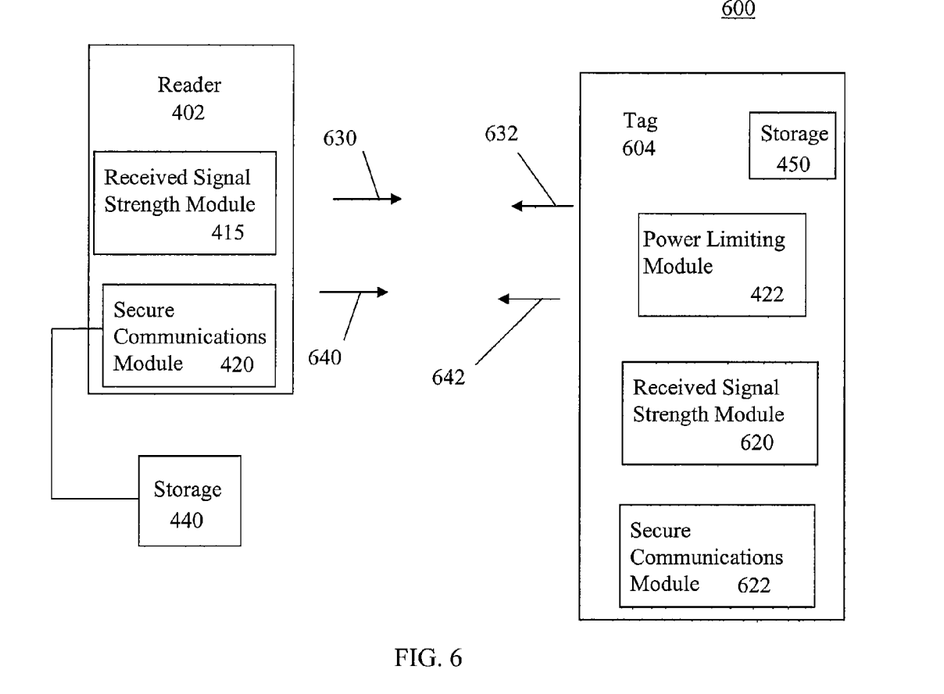
FIG. 6 illustrates an environment where a reader communicates with an RFID tag, according to an embodiment of the present invention.

FIG. 6 shows an environment 600 in which reader 402 communicates with a tag 604. Reader 402 is substantially similar to reader 402 described with reference to FIG. 4. Tag 604 is generally similar to tag 404a, described with reference to FIG. 4. However, tag 604 additionally includes a received signal strength module 620 and a secure communications module 622. The operation of environment 600 will be described with reference to a flowchart 700 provided in FIG. 7.

Figure 7:
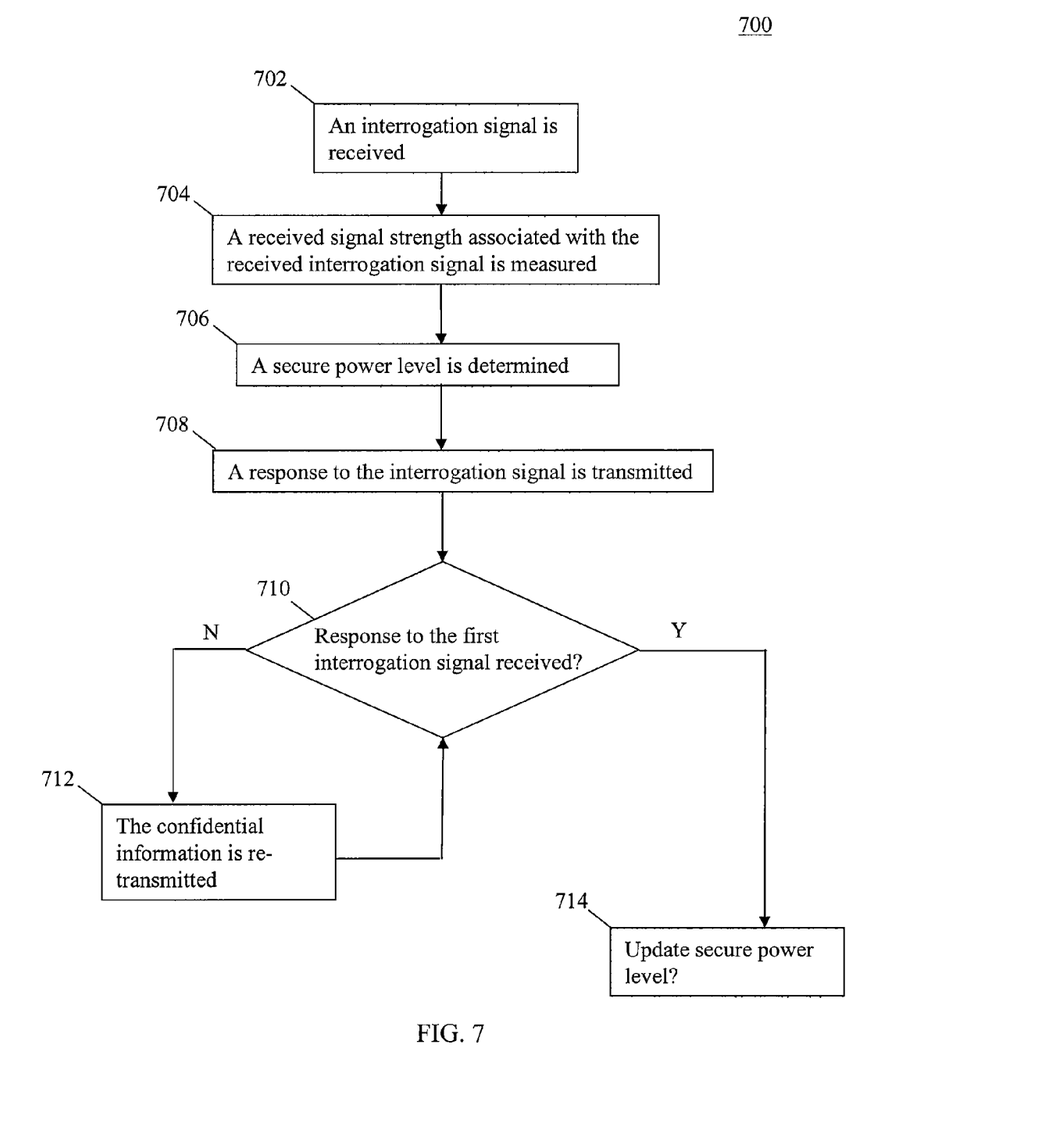
FIG. 7 shows a flowchart providing example steps for communicating with an RFID tag, according to an embodiment of the present invention.

FIG. 7 shows a flowchart 700 providing example steps for communicating with an RFID tag, according to an embodiment of the present invention. Other structural and operational embodiments will be apparent to persons skilled in the relevant art(s) based on the following discussion. Flowchart 700 is described with reference to the embodiment of FIG. 6. However, flowchart 700 is not limited to that embodiment. The steps shown in FIG. 7 do not necessarily have to occur in the order shown. The steps of FIG. 7 are described in detail below.

Flowchart 700 begins with step 702. In step 702 an interrogation signal is received. For example in FIG. 6, tag 604 receives an interrogation signal 630 transmitted by reader 402. Interrogation signal 630 includes a request for confidential information. The confidential information may be stored in storage 450 of tag 604.

In step 704, a received signal strength associated with the received interrogation signal is measured. For example, in FIG. 6, received signal strength module 620 measures a received signal strength associated with interrogation signal 630. Received signal strength module 620 may generate an RSSI value that is proportional to the received signal strength of interrogation signal 630. The RSSI value may be stored as an entry in storage 450.

In step 706, a secure power level is determined. For example, in FIG. 6, secure communications module 622 of tag 604 may determine a secure power level as the minimum power level that will allow a response to interrogation signal 630 to be received by reader 402.

As described above, power limiting module 422 of tag 604 may have a predefined plurality of power levels, with each of these predefined power levels corresponding to different levels of attenuation of a backscattered response. Secure communications module 622 may choose from the predefined plurality of power levels based at least on the measured received signal strength associated with interrogation signal 630. Tag 604 may store a set of predefined thresholds in storage 450. Each threshold may be associated with a corresponding backscatter power level. For example, tag 604 may store thresholds 1 and 2, with threshold 1 being greater than threshold 2. Each of the thresholds may be an RSSI value. If the RSSI value associated with interrogation signal is larger than threshold 2, but smaller than threshold 1, secure communications module sets the secure power level at power level 2. Power level 2, then, corresponds to the minimum output power level of tag 604 so that a response 632 to interrogation signal 630 is received by reader 402. Alternatively, if the RSSI value associated with interrogation signal 630 is larger than threshold 1, then the secure power level may be set at power level 3.

In step 708, a response to the interrogation signal is transmitted. The response is transmitted at the secure power level. The response includes the confidential information. For example, in FIG. 6, tag 604 transmits backscattered response 632. In an embodiment, an identification code or a portion of an identification code may be included in backscattered response 632. The identification code may identify tag 604 and/or an item with which tag 604 is associated.

In step 710, it is determined whether the response to the interrogation signal received. Tag 604 may determine that response 632 is not received by reader 402 by receiving a second interrogation signal 640 that includes a command to re-transmit the requested confidential information. Alternatively, second interrogation signal 640 may include a request for a second set of information that may or may not be confidential. In such a case, second interrogation signal 640 may indicate that response 632 has been received. As would be apparent to those skilled in the relevant art(s), tag 604 may also determine whether response 632 is received in other ways based on the particular communication protocol being employed by reader 402 and tag 604.

If it is determined that the response to the interrogation signal is not received, flowchart 700 proceeds to step 712. In step 712, the confidential information is re-transmitted. For example, in FIG. 6, tag 604 may receive second interrogation signal 640 transmitted by reader 402. The second interrogation signal may request that the confidential information requested by interrogation signal 630 be re-transmitted. In response, tag 604 may provide a backscattered response 642 at an increased power level.

Flowchart 700 then returns to decision step 710. If the re-transmitted confidential data is not received, tag 604 may continue to re-transmit the confidential data at increasing power levels until it is received by reader 402.

Once the confidential information is received, flowchart 700 proceeds to step 714. In step 714, the secure power level may be updated. The secure power level may be updated based on second interrogation signal 640. The backscatter power level may be updated by comparing an RSSI value associated with interrogation signal 640 with the set of predefined thresholds, as described with reference to step 706. Additionally or alternatively, reader 402 may instruct tag 604 to update the set of stored thresholds that are used to determine the secure power level. Thus, the stored set of thresholds may be set by a user that communicates with tag 604 through reader 402.

Flowcharts 500 and 700 provide two methods to securely communicate confidential information. The method provided in flowchart 700 allows the confidential information to be transmitted in one communication iteration (i.e., interrogation signal and corresponding response) while the method provided in flowchart 500 requires at least two communication iterations to transmit the confidential information. Thus, by having the tag determine the secure power level instead of the reader, one communication iteration may be saved.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of communicating with a population of radio frequency identification (RFID) tags, comprising:
   transmitting a first interrogation signal;
   receiving a first response to the first interrogation signal from at least one RFID tag at a first received signal strength, wherein the response includes at least a portion of a first identification code;
   determining a secure power level as a lowest power level such that a second response to a second interrogation signal is received;
   transmitting the second interrogation signal that includes a request for confidential information, a command to transmit a response to the second interrogation signal at the determined secure power level, and said first identification code, wherein said at least one RFID tag is configured to adjust power to transmit the response to the second interrogation signal at the determined secure power level based on the request
   receiving the second response to the second interrogation signal at a second received signal strength, wherein the second response includes confidential information, wherein the second received signal strength is less than the first received signal strength;
   wherein if the second response to the second interrogation is not received, transmitting a third interrogation signal that includes a command to re-transmit the confidential information at an increased power level, and receiving a third response to the third interrogation signal at a third received signal strength, wherein the third response includes confidential information, wherein the third received signal strength is less than the first received signal strength and is higher than the second received signal strength.

2. The method of claim 1, further comprising:
   determining the secure output power level based at least on the first received signal strength.

3. The method of claim 2, wherein the first received signal strength is expressed as a received signal strength indication (RSSI).

4. The method of claim 1, further comprising:
storing at least one of the first received signal strength and the second received signal strength.

5. The method of claim 4, further comprising:
updating the secure power level based at least on the second received signal strength.

6. The method of claim 1, further comprising:
storing received confidential information.

7. The method of claim 1, wherein the first identification code identifies a first RFID tag of the population of RFID tags as storing desired confidential information, wherein the first RFID tag of the population of RFID tags transmits a response to the second interrogation signal that includes the desired confidential information, wherein the response is transmitted at the secure power level.

8. The method of claim 7, wherein the second interrogation signal further includes a second identification code that identifies a second RFID tag of the population of RFID tags as storing second desired confidential information and a second secure power level, wherein the second RFID tag of the population of RFID tags transmits a second response to the second interrogation signal that includes the second desired confidential information, wherein the second response is transmitted at the second secure power level.

9. The method of claim 1, further comprising:
performing a contention resolution protocol to isolate one RFID tag of the population of RFID tags.

10. A system for performing a radio frequency identification (RFID) communications, comprising:
reader means for transmitting an interrogation signal and determining a secure power level for confidential information, wherein the determined secure power level comprises one of a plurality of power levels;
tag means for receiving the interrogation signal that includes a request for the confidential information and the determined secure power level;
tag means for transmitting a response to the interrogation signal at the determined secure power level including the confidential information, and for transmitting a response to an interrogation signal for regular information at a regular power level, wherein the determined secure power level is less than the regular power level;
reader means for receiving the response, wherein the determined secure power level is the lowest power level of the plurality of power levels for the tag means for transmitting such that the response from the tag means for transmitting is received by the reader means for receiving; and
reader means for adjusting the secure power level responsive to a failure in receiving the response.

11. The system of claim 10, wherein the tag means for transmitting is configured to select the determined secure power level from the plurality of power levels based upon the request.

12. The system of claim 10, wherein the reader means for adjusting is configured to select the determined secure power level as the lowest power level such that a response from the tag means for transmitting is received by a reader.

13. The system of claim 10, wherein the reader means for adjusting is configured to adjust the secure power level responsive communication parameters being changed between a tag and a reader.

14. The method of claim 1, further comprising:
updating the secure power level based on a change in communication parameters to the at least one RFID tag.

* * * * *

UNITED STATES PATENT AND TRADEMARK OFFICE
CERTIFICATE OF CORRECTION

PATENT NO. : 8,237,546 B2  
APPLICATION NO. : 11/770572  
DATED : August 7, 2012  
INVENTOR(S) : Bekritsky et al.

Page 1 of 1

It is certified that error appears in the above-identified patent and that said Letters Patent is hereby corrected as shown below:

In Column 12, Line 46, in Claim 1, delete "request" and insert -- request; --, therefor.

Signed and Sealed this  
Twenty-second Day of January, 2013

David J. Kappos  
*Director of the United States Patent and Trademark Office*